United States Patent
Li

(10) Patent No.: US 10,649,208 B2
(45) Date of Patent: May 12, 2020

(54) HEAD-UP DISPLAY DEVICE, HEAD-UP DISPLAY METHOD AND VEHICLE

(71) Applicant: BOE Technology Group Co., Ltd., Beijing (CN)

(72) Inventor: Dianmeng Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 239 days.

(21) Appl. No.: 15/863,083

(22) Filed: Jan. 5, 2018

(65) Prior Publication Data
US 2018/0314065 A1 Nov. 1, 2018

(30) Foreign Application Priority Data
Apr. 28, 2017 (CN) .......................... 2017 1 0294707

(51) Int. Cl.
*G02B 27/01* (2006.01)
*B60K 35/00* (2006.01)

(52) U.S. Cl.
CPC .......... *G02B 27/0103* (2013.01); *B60K 35/00* (2013.01); *B60K 2370/1529* (2019.05); *B60K 2370/23* (2019.05); *B60K 2370/29* (2019.05); *B60K 2370/333* (2019.05); *B60K 2370/334* (2019.05); *G02B 2027/0105* (2013.01); *G02B 2027/0141* (2013.01); *G02B 2027/0185* (2013.01)

(58) Field of Classification Search
CPC ................ G02B 27/01; G02B 27/0101; G02B 2027/013; G02B 27/0149; G02B 2027/0154; G02B 2027/0161; G02B 2027/0196
See application file for complete search history.

(56) References Cited

U.S. PATENT DOCUMENTS

| 9,291,819 B2 | 3/2016 | Ferri |
| 2011/0175798 A1 | 7/2011 | Sato et al. |

(Continued)

FOREIGN PATENT DOCUMENTS

| CN | 104040438 A | 9/2014 |
| CN | 106605166 A | 4/2017 |

OTHER PUBLICATIONS

First Office Action, including Search Report, for Chinese Patent Application No. 201710294707.1, dated Oct. 8, 2018, 13 pages.

*Primary Examiner* — Robert E. Tallman
(74) *Attorney, Agent, or Firm* — Westman, Champlin & Koehler, P.A.

(57) ABSTRACT

A head-up display device, a head-up display method and a vehicle are provided. The head-up display device includes: a light source configured to generate a to-be-modulated light beam; a phase spatial light modulator configured to modulate a phase of the to-be-modulated light beam and emit at least two phase-modulated light beams; a reproduction component configured to perform image reproduction on the at least two phase-modulated light beams, so as to generate at least two reproduced images; at least two diffusers configured to receive and diffuse the at least two reproduced images generated by the reproduction component respectively; and a reflector assembly configured to guide the at least two light beams diffused by the at least two diffusers to a projection region, so as to form at least two projection images at different spatial positions.

18 Claims, 1 Drawing Sheet

(56) References Cited

U.S. PATENT DOCUMENTS

| | | |
|---|---|---|
| 2013/0265622 A1 | 10/2013 | Christmas et al. |
| 2014/0253987 A1 | 9/2014 | Christmas |
| 2015/0061976 A1* | 3/2015 | Ferri .................. G02B 27/0101 345/9 |
| 2017/0115627 A1* | 4/2017 | Christmas ............ G03H 1/2205 |
| 2017/0235138 A1* | 8/2017 | Morohashi ............. B60K 35/00 359/631 |
| 2017/0329143 A1* | 11/2017 | Svarichevsky ........ B60K 35/00 |
| 2018/0157036 A1* | 6/2018 | Choi .................. G02B 27/0101 |

* cited by examiner

HEAD-UP DISPLAY DEVICE, HEAD-UP DISPLAY METHOD AND VEHICLE

CROSS-REFERENCE TO RELATED APPLICATION

The present application claims a priority of the Chinese patent application No. 201710294707.1 filed on Apr. 28, 2017, which is incorporated herein by reference in its entirety.

TECHNICAL FIELD

The present disclosure relates to the field of head-up display technology, in particular to a head-up display device, a head-up display method and a vehicle.

BACKGROUND

As an on-board visual assistant system, a head-up display (HUD) may be used to project vehicle state information (e.g., speed and fuel capacity) and road condition information (e.g., navigation and hazard warning) to an appropriate position in front of a driver, so as to prevent the road ahead from being out of the driver's sight while the driver is viewing the above-mentioned information, thereby to prevent the occurrence of a visual blind area for the driver when the driver is looking down at an instrument board, and improve the driving security.

In the related art, a HUD device including a phase spatial light modulator has already been proposed. However, this kind of HUD device is merely capable of providing one projection plane for the vehicle state information and the road condition information. When both the vehicle state information and the road condition information are to be displayed, they need to be displayed in a same projection plane in a mixed manner, so a display effect may be adversely affected.

SUMMARY

An object of the present disclosure is to provide a head-up display device, a head-up display method and a vehicle, so as to solve the problem in the related art where the head-up display device is capable of providing a projection plane and thereby the display effect is adversely affected when various pieces of information are to be displayed.

In one aspect, the present disclosure provides in some embodiments a head-up display device, including: a light source configured to generate a to-be-modulated light beam; a phase spatial light modulator configured to modulate a phase of the to-be-modulated light beam and emit at least two phase-modulated light beams; a reproduction component configured to perform image reproduction on the at least two phase-modulated light beams, so as to generate at least two reproduced images; at least two diffusers configured to receive and diffuse the at least two reproduced images generated by the reproduction component respectively; and a reflector assembly configured to guide the at least two light beams diffused by the at least two diffusers to a projection region, so as to form at least two projection images at different spatial positions.

In a possible embodiment of the present disclosure, the head-up display device further includes a collimating and beam expanding component arranged between the light source and the phase spatial light modulator, and configured to convert the to-be-modulated light beam from the light source into a collimated to-be-modulated light beam and transmit the collimated to-be-modulated light beam to the phase spatial light modulator.

In a possible embodiment of the present disclosure, the phase spatial light modulator is a phase-only spatial light modulator.

In a possible embodiment of the present disclosure, an incident surface of the phase spatial light modulator is divided into at least two sub-regions, the phase spatial light modulator includes at least two first loading components, and each sub-region corresponds to one of the at least two first loading components. Each first loading component is configured to load a composite phase hologram of a target image, so as to modulate the phase of the to-be-modulated light beam.

In a possible embodiment of the present disclosure, the composite phase hologram of the target image is generated by superimposing a phase hologram of the target image with a grating phase hologram, or with the grating phase hologram and a lens phase hologram. The grating phase holograms of different sub-regions have different phase factors.

In a possible embodiment of the present disclosure, the phase factor of each grating phase hologram includes a grating period.

In a possible embodiment of the present disclosure, the lens phase holograms corresponding to different sub-regions have different phase factors, and the phase factor of each lens phase hologram is a focal length of a lens.

In a possible embodiment of the present disclosure, the phase spatial light modulator includes a second loading component configured to load composite phase holograms of different target images in a time-division manner, so as to modulate the phase of the to-be-modulated light beam. The composite phase hologram of each target image is generated by superimposing a phase hologram of the target image with a grating phase hologram, or with the grating phase hologram and a lens phase hologram. The grating phase holograms of different target images have different phase factors.

In a possible embodiment of the present disclosure, the head-up display device further includes a processor connected to the phase spatial light modulator, and configured to superimpose the phase hologram of the target image with the grating phase hologram, or superimpose the phase hologram of the target image with the grating phase hologram and the lens phase hologram, so as to generate the composite phase hologram of the target image. The grating phase holograms of different target images have different phase factors.

In a possible embodiment of the present disclosure, the reproduction component is a Fourier lens.

In a possible embodiment of the present disclosure, the reflector assembly includes a plane reflector and a concave reflector. The light beams diffused by the at least two diffusers are reflected by a reflecting surface of the plane reflector toward the concave reflector and then reflected by a reflecting surface of the concave reflector toward the projection region.

In a possible embodiment of the present disclosure, the at least two diffusers include at least one adjustable diffuser capable of moving in an axial direction perpendicular to a projection plane where the projection image is located.

In a possible embodiment of the present disclosure, the head-up display device further includes a movable component configured to drive the adjustable diffuser to move in the axial direction.

In a possible embodiment of the present disclosure, the phase spatial light modulator further includes a three-dimensional (3D) loading sub-component configured to superimpose different phase holograms of a same target image within a predetermined time period. The composite phase hologram of the target image is generated by superimposing the phase hologram of the target image with the grating phase hologram and the lens phase hologram. The lens phase holograms corresponding to different phase holograms of the same target image have different focal lengths, so that the target image is displayed at different positions in the axial direction. The head-up display device further includes a controller configured to move the movable component to a position in the axial direction in accordance with the positions of the target image to be displayed in the axial direction, so as to achieve 3D display.

In a possible embodiment of the present disclosure, the light source is a coherent light source.

In a possible embodiment of the present disclosure, the to-be-modulated light beam from the light source is a collimated light beam which is transmitted to the phase spatial light modulator at a predetermined angle of 2 to 20 degrees relative to a vertical incident direction.

In another aspect, the present disclosure provides in some embodiments a head-up display method used for the above-mentioned head-up display device, including steps of: modulating a phase of a to-be-modulated light beam from a light source, so as to acquire at least two modulated light beams in different emergent directions; performing image reproduction on the at least two modulated light beams, so as to acquire at least two reproduced images corresponding to the at least two modulated light beams; receiving and diffusing, by at least two diffusers, the at least two reproduced images; and guiding the light beams diffused by the at least two diffusers to a projection region, so as to form at least two projection images at different spatial positions.

In yet another aspect, the present disclosure provides in some embodiments a vehicle including the above-mentioned head-up display device. A light beam from the head-up display device is transmitted to a front windshield of the vehicle and reflected by the front windshield of the vehicle toward human eyes.

In a possible embodiment of the present disclosure, one projection image is configured to display vehicle state information about the vehicle, and at least another projection image is configured to display road condition information.

In a possible embodiment of the present disclosure, the vehicle state information is a two-dimensional (2D) projection image, and the road condition information is a 2D or 3D projection image.

According to the embodiments of the present disclosure, it is able for the head-up display device to form at least two projection images at different spatial positions, and display the information of different types through the different projection images, thereby to meet different display requirements.

DETAILED DESCRIPTION OF THE EMBODIMENTS

Figure 1:
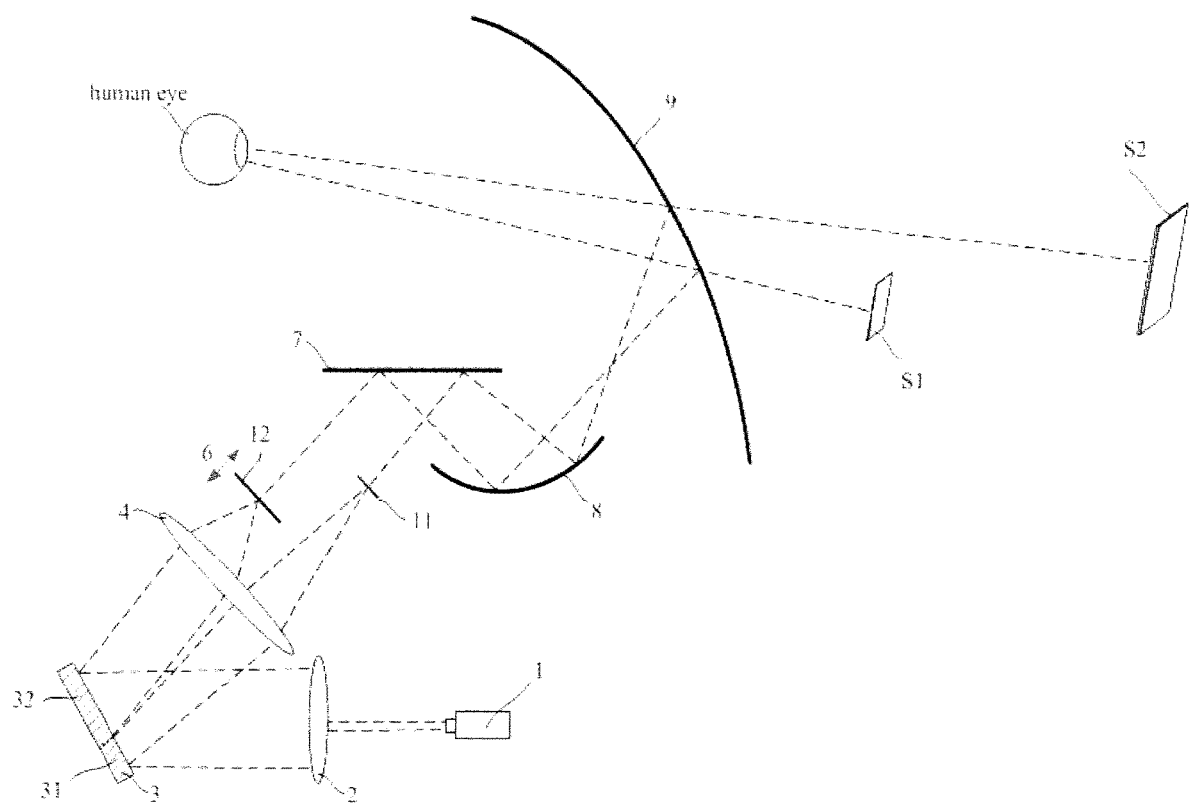
FIG. 1 is a schematic view showing a head-up display device according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The present disclosure provides in some embodiments a head-up display device, which includes: a light source configured to emit a to-be-modulated light beam; a phase spatial light modulator configured to load a composite phase hologram of a target image, modulate a phase of the to-be-modulated light beam and emit at least two phase-modulated light beams; a reproduction component configured to perform image reproduction on the at least two phase-modulated light beams, so as to generate at least two reproduced images corresponding to the at least two phase-modulated light beams, the at least two reproduced images being separated from each other and located at different spatial positions; at least two diffusers configured to receive and diffuse the at least two reproduced images respectively; and a reflector assembly configured to guide the at least two light beams diffused by the diffusers to a projection region, so as to form at least two projection images at different spatial positions.

According to the head-up display device in the embodiments of the present disclosure, it is able to form the at least two projection images at different spatial positions and display the information of different types through the different projection images, thereby to meet various display requirements.

In a possible embodiment of the present disclosure, the light source is a coherent light source. The so-called coherent light source refers to a light source capable of emit light beams at a same frequency, having a same vibration direction, and having a constant phase difference. In some embodiments of the present disclosure, the light source may be a laser capable of emitting red, green and blue light beams. In some other embodiments of the present disclosure, the light source may also be a coherent light-emitting diode (LED) capable of emitting red, green and blue light beams.

In order to improve the utilization of the light beams, in a possible embodiment of the present disclosure, the to-be-modulated light beam from the light source is a collimated light beam.

Of course, in some embodiments of the present disclosure, the to-be-modulated light beam from the light source may not be a collimated light beam. At this time, in a possible embodiment of the present disclosure, the head-up display device may further include a collimating and beam expanding component arranged between the light source and the phase spatial light modulator, and configured to convert the to-be-modulated light beam from the light source into a collimated to-be-modulated light beam and transmit the collimated to-be-modulated light beam to the phase spatial light modulator.

In some embodiments of the present disclosure, when the to-be-modulated light beam from the light source is the collimated light beam, no collimating and beam expanding component may be arranged between the light source and the phase spatial light modulator. When the to-be-modulated light beam from the light source is the collimated light beam, a distance between the light source and the phase spatial light modulator may not be limited particularly and thereby may be adjusted in accordance with the practical need. In addition, the to-be-modulated light beam from the light source may be vertically transmitted to the phase spatial light modulator. In phase holography, diffraction efficiency would ideally be 100% and a zero-order light beam can be modulated completely. However, diffraction efficiency actually is not 100% because 100% duty cycle for each pixel cannot be implemented for a spatial light modulator, there exists part of zero-order light beam which cannot be modulated. In a possible embodiment of the present disclosure, the to-be-modulated light beam from the light source may be transmitted to the phase spatial light modulator at a predetermined angle of 2 to 20 degrees relative to a vertical incident direction.

In some other embodiments of the present disclosure, when the collimating and beam expanding component is arranged between the light source and the phase spatial light modulator, the light beam from the collimating and beam expanding component is the collimated light beam, so the distance between the collimating and beam expanding component and the phase spatial light modulator may not be limited particularly and thereby may be adjusted in accordance with the practical need. In addition, the to-be-modulated light beam from the collimating and beam expanding component may be vertically transmitted to the phase spatial light modulator. However, in phase holography, there essentially exists a zero-order light beam which cannot be modulated completely, so in a possible embodiment of the present disclosure, the to-be-modulated light beam from the collimating and beam expanding component may be transmitted to the phase spatial light modulator at the predetermined angle of 2 to 20 degrees relative to the vertical incident direction.

The phase spatial light modulator is a phase diffractive optical element (e.g., a phase Liquid Crystal ON Silicon (LCoS) element) with a pixelated structure, and it is capable of loading different phase holograms (also called as phase grayscale images), so as to achieve different phase delay distributions, thereby to modulate the phase of the incident light beam.

In a possible embodiment of the present disclosure, the phase spatial light modulator may be a phase-only spatial light modulator. The phase-only spatial light modulator may merely modulate the phase of the incident light beam, so as to provide a better modulation effect. In some other embodiments of the present disclosure, the phase spatial light modulator may also be a phase-amplitude spatial light modulator capable of modulating both the phase and an amplitude of the incident light beam.

In a possible embodiment of the present disclosure, the phase hologram loaded by the phase spatial light modulator is a Fraunhofer phase hologram of the target image. When the phase hologram loaded by the phase-only spatial light modulator is a Fraunhofer phase hologram of the target image, an emergent light beam is transmitted through a Fourier lens so as to reproduce the target image in a focal plane of the Fourier lens. In the embodiments of the present disclosure, the phase spatial light modulator may modulate the phase of the to-be-modulated light beam in various ways, so as to acquire the at least two modulated light beams in different emergent directions.

In some embodiments of the present disclosure, an incident plane of the phase spatial light modulator may be divided into at least two sub-regions. The phase spatial light modulator includes at least two first loading components, and each sub-region corresponds to one of the at least two first loading components. Each first loading component is configured to load a composite phase hologram of a target image, so as to modulate the phase of the to-be-modulated light beam. The composite phase hologram of the target image is generated by superimposing a phase hologram of the target image with a grating phase hologram, or with the grating phase hologram and a lens phase hologram. The grating phase holograms corresponding to different sub-regions have different phase factors. The phase factor of each grating phase hologram may include a grating period.

Through the grating phase hologram, it is able to deflect the light beam by a certain angle, and when the grating phase holograms corresponding to different sub-regions have different phase factors (e.g., different grating periods), it is able to deflect the light beams passing through the different sub-regions by different angles, thereby to prevent the acquired at least two projection images from being superimposed and interfering each other. Through the lens phase hologram, it is able to focus or diverge the light beam, and when the lens phase holograms corresponding to different sub-regions have different phase factors (e.g., different focal lengths of lenses), it is able to provide the light beams passing through the different sub-regions with different focal lengths, thereby to change the focal length dynamically and provide different distances between the acquired different projection images and a viewer.

Figure 2:
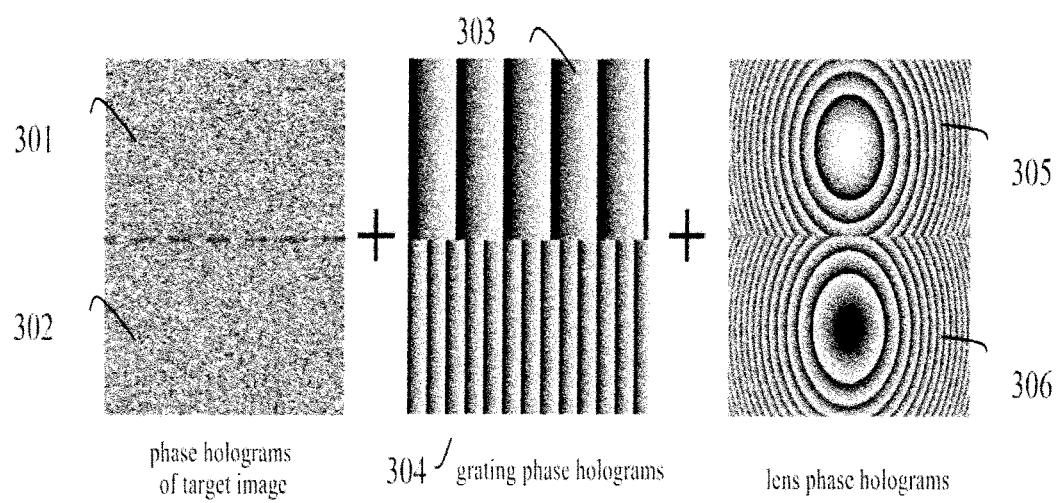
FIG. 2 is a schematic view showing phase holograms, grating phase holograms and lens phase holograms of a target image according to one embodiment of the present disclosure.

FIG. 2 shows a phase hologram 301 of the target image, a phase hologram 302 of the target image, a grating phase hologram 303, a grating phase hologram 304, a lens phase hologram 305 and a lens phase hologram 306. In the embodiments of the present disclosure, the incident surface of the phase spatial light modulator is divided into two sub-regions, the phase spatial light modulator includes two first loading components, and each sub-region corresponds to one of the two first loading components. A composite phase hologram of the target image loaded by one of the two first loading components is generated by superimposing the phase hologram 301 of the target image, the grating phase hologram 303 and the lens phase hologram 305, and a composite phase hologram of the target image loaded by the other of the two first loading components is generated by superimposing the phase hologram 302 of the target image, the grating phase hologram 304 and the lens phase hologram 306. As shown in FIG. 2, the grating phase hologram 303 and the grating phase hologram 304 have different grating phase factors (i.e., different grating periods), so it is able to deflect the light beams passing through the different sub-regions of the incident surface of the phase spatial light modulator by different angles. The lens phase hologram 305 and the lens phase hologram 306 have different lens phase factors (i.e., different focal lengths), so it is able to provide the light beams passing through the different sub-regions of the incident surface of the phase spatial light modulator with different focal lengths.

In some other embodiments of the present disclosure, the phase spatial light modulator may further include a second loading component configured to load composite phase holograms of different target images in a time-division manner, so as to modulate the phase of the to-be-modulated light beam. The composite phase hologram of each target image is generated by superimposing a phase hologram of the target image with a grating phase hologram, or with the grating phase hologram and a lens phase hologram. The grating phase holograms corresponding to different target images have different phase factors.

Through the grating phase hologram, it is able to deflect the light beam by a certain angle, and when the grating phase holograms loaded at different time points have different phase factors (e.g., different grating periods), it is able to deflect the light beams at the different time points by different angles. Through the lens phase hologram, it is able to focus or diverge the light beam, and when the lens phase holograms loaded at different time points have different phase factors (e.g., different focal lengths of lenses), it is able to provide the light beams at the different time points with different focal lengths, thereby to change the focal length dynamically.

In a possible embodiment of the present disclosure, the head-up display device further includes a processor connected to the phase spatial light modulator, and configured to superimpose the phase hologram of the target image with the grating phase hologram, or superimpose the phase hologram of the target image with the grating phase hologram and the lens phase hologram, so as to generate the composite phase hologram of the target image. The grating phase holograms corresponding to different target images have different phase factors. The processor may be a personal computer (PC), a field-programmable gate array (FPGA) or an Acorn Reduced Instruction-Set Computer (RISC) Machine (ARM).

In a possible embodiment of the present disclosure, the processor may acquire the composite phase hologram of the target image through such an algorithm as quick phase recovery.

In other words, the processors may acquire the composite phase hologram of the target image and transmit it to the phase spatial light modulator. Of course, in some other embodiments of the present disclosure, the phase spatial light modulator may generate by itself the composite phase hologram of the target image.

According to the embodiments of the present disclosure, the phase spatial light modulator may simulate a function of a grating, or functions of the grating and a lens, so as to focus, diverge and deflect the light beam, thereby to generate at least two projection images at different spatial positions with a simple structure and low manufacture cost.

In a possible embodiment of the present disclosure, the reproduction component may be a Fourier lens. In this case, the phase spatial light modulator needs to be arranged in a front focal plane of the Fourier lens, and the at least two diffusers need to be arranged in proximity to a back focal plane of the Fourier lens. A position of each diffuser depends on the phase factor of the corresponding lens phase hologram. Of course, in some other embodiments of the present disclosure, the reproduction component may be an optical element of any other type.

In the embodiments of the present disclosure, the diffuser function as to enable the incident light beam to be refracted, reflected and scattered in different directions when the incident light beams pass through two media having different refraction indices (densities), so as to change an optical path of the light beam, thereby to scatter the incident light beam sufficiently and generate an optical diffusion effect.

In the embodiments of the present disclosure, the reflector assembly may be an optical element of various types, which will be illustratively described hereinafter.

In a possible embodiment of the present disclosure, the reflector assembly may include a plane reflector and a concave reflector. The light beams diffused by the at least two diffusers are reflected by a reflecting surface of the plane reflector toward the concave reflector and then reflected by a reflecting surface of the concave reflector toward the projection region. Apart from a reflecting function, the concave reflector may further have imaging and amplifying functions.

In a possible embodiment of the present disclosure, the plane reflector and/or the concave reflector are of a folded type, so as to reduce a volume of the entire reflector assembly.

However, in some other embodiments of the present disclosure, the reflector assembly may be of any other type. For example, it may merely include a concave reflector, or include a concave reflector and a convex reflector. In addition, the number of the reflector is not limited to two.

As mentioned above, through the lens phase hologram, it is able to focus or diverge the light beam, and when the lens phase holograms loaded by the phase spatial light modulator have different phase factors, it is able to provide the light beams from the phase spatial light modulator with different focal lengths, thereby to form the at least two projection images at different positions in an axial direction. The axial direction refers to a direction perpendicular to a projection plane where the projection image is located, that is a direction vertical to the at least two diffusers. In addition, the at least two diffusers need to include at least one adjustable diffuser capable of moving in the axial direction, so as to cooperate with different lens phase holograms to form the at least two projection images at different position in the axial direction.

In order to move the adjustable diffuser, the head-up display device may further include a movable component configured to drive the adjustable diffuser to move in the axial direction. In a possible embodiment of the present disclosure, the movable component is an electrical component capable of moving along a straight line.

In a possible embodiment of the present disclosure, the at least two projection images may be all 2D images, all 3D images, a part of 3D images or a part of 3D images.

In order to achieve 3D display, in a possible embodiment of the present disclosure, the phase spatial light modulator may further include a 3D loading sub-component configured to superimpose different phase holograms of a same target image within a predetermined time period. The composite phase hologram of the target image is generated by superimposing the phase hologram of the target image with the grating phase hologram and the lens phase hologram. The lens phase holograms corresponding to different phase holograms of the same target image have different focal lengths, so that the target image is displayed at different positions in the axial direction. The head-up display device further includes a controller configured to move the movable component to a position in the axial direction in accordance with the positions of the target image to be displayed in the axial direction, so as to achieve the 3D display.

In a possible embodiment of the present disclosure, the incident surface of the phase spatial light modulator is divided into at least two sub-regions. The phase spatial light modulator includes at least two first loading components, and each sub-region corresponds to one of the at least two first loading components. Each first loading component is configured to load the composite phase hologram of the target image, so as to modulate the phase of the to-be-modulated light beam. The composite phase hologram of the target image is generated by superimposing the phase hologram of the target image with the grating phase hologram, or with the grating phase hologram and the lens phase hologram. The grating phase holograms corresponding to different sub-regions have different phase factors.

In order to achieve the 3D display, at least one of the first loading components is provided with the 3D loading sub-component which is configured to superimpose different phase holograms of a same target image within the predetermined time period. The composite phase hologram of the target image is generated by superimposing the phase hologram of the target image with the grating phase hologram and the lens phase hologram. The lens phase holograms corresponding to different phase holograms of the same target image have different focal lengths, so that the target image is displayed at different positions in the axial direction.

In some other embodiments of the present disclosure, the phase spatial light modulator includes the second loading component configured to load the composite phase holograms of different target images in a time-division manner, so as to modulate the phase of the to-be-modulated light beam. The composite phase hologram of each target image is generated by superimposing the phase hologram of the target image with the grating phase hologram, or with the grating phase hologram and the lens phase hologram. The grating phase holograms corresponding to different target images have different phase factors.

In order to achieve the 3D display, the second loading component includes the 3D loading sub-component configured to superimpose different phase holograms of a same target image in the case of displaying a 3D projection image. The composite phase hologram of the target image is generated by superimposing the phase hologram of the target image with the grating phase hologram and the lens phase hologram. The lens phase holograms corresponding to different phase holograms of the same target image have different focal lengths, so that the target image is displayed at different positions in the axial direction.

Referring to FIG. 1, the head-up display device includes a light source 1, a collimating and beam expanding component 2, a phase spatial light modulator 3, a Fourier lens 4, a diffuser 1, a diffuser 12, a plane reflector 7 and a concave reflector 8. The light source 1 is configured to emit a coherent to-be-modulated light beam toward the collimating and beam expanding component 2. The collimating and beam expanding component 2 is configured to convert the received to-be-modulated light beam into a collimated to-be-modulated light beam and transmit it to an incident surface of the phase spatial light modulator 3 at a predetermined angle of 2 to 20 degrees relative to a vertical incident direction.

The incident surface of the phase spatial light modulator 3 is divided into two sub-regions 31 and 32. The phase spatial light modulator 3 is configured to load composite phase holograms of a target image through the sub-regions 31 and 32, and modulate a phase of the incident to-be-modulated light beam on the basis of phase holograms of the target image, so as to acquire two phase-modulated light beams in different emergent directions. A grating phase hologram and a lens phase hologram corresponding to the composite phase hologram of the target image loaded through the sub-region 31 are different from those loaded through the sub-region 32. Referring to FIG. 2, the composite phase hologram of the target image loaded through the sub-region 31 is generated by superimposing the phase hologram 301 of the target image with the grating phase hologram 303 and the lens phase hologram 305, and the composite phase hologram of the target image loaded through the sub-region 32 is generated by superimposing the phase hologram 302 of the target image with the grating phase hologram 304 and the lens phase hologram 306.

The Fourier lens 4 is configured to receive the two modulated light beams from the phase spatial light modulator 3, and perform image production on the two modulated light beams, so as to acquire two reproduced images corresponding to the two modulated light beams. The two reproduced images are separated from each other and located at different spatial positions. The two reproduced images reproduced by the Fourier lens 4 are transmitted to the diffuser 11 and diffuser 12 respectively.

The diffusers 11 and 12 are configured to diffuse the reproduced images respectively. The diffuser 11 is a fixed diffuser, and the diffuser 12 is an adjustable diffuser and connected to a movable component 6. The movable component 6 is configured to drive the diffuser 12 to move in an axial direction that is perpendicular to a projection plane where the projection image is located.

The light beams diffused by the diffusers 11 and 12 are reflected by a reflection surface of the plane reflector 7 toward a reflection surface of the concave reflector 8, then reflected by the reflection surface of the concave reflector 8 toward a front windshield 9 of a vehicle, and then reflected by the front windshield 9 to human eyes, so as to form two projection images S1 and S2 at different spatial positions.

In order to achieve the 3D projection display, the phase spatial light modulator 3 is configured to superimpose different phase holograms of a same target image through the sub-region 32 within a predetermined time period. The composite phase hologram of the target image is generated by superimposing the phase hologram of the target image with the grating phase hologram and the lens phase hologram. The lens phase holograms corresponding to different phase holograms of the same target image have different focal lengths, so that the target images are displayed at different positions in the axial direction. In addition, the adjustable diffuser 12 moves in synchronization with axial imaging positions, so as to provide a 3D image due to the effect of visual persistence.

It should be appreciated that, in the embodiments of the present disclosure, apart from the formation of two projection images at different spatial positions, it is also able to divide the incident surface of the phase spatial light modulator into three or more sub-regions and provide the corresponding numbers of diffusers, so as to form three or more projection images at different spatial positions.

Based on a same inventive concept, the present disclosure further provides in some embodiments a head-up display method for use in the above-mentioned head-up display device, which includes: Step S1 of loading a composite phase hologram of a target image, and modulating a phase of a to-be-modulated light beam from a light source, so as to acquire at least two phase-modulated light beams in different emergent directions; Step S2 of performing image reproduction on the at least two phase-modulated light beams, so as to acquire at least two reproduced images corresponding to the at least two phase-modulated light beams; Step S3 of receiving and diffusing, by at least two diffusers, the at least two reproduced images; and Step S4 of guiding the light beams diffused by the at least two diffusers to a projection region, so as to form at least two projection images at different spatial positions.

The structure and the operation principle of the head-up display device will not be particularly defined herein.

The present disclosure further provides in some embodiments a vehicle including the above-mentioned head-up display device. A light beam from the head-up display device is transmitted to a front windshield of the vehicle and reflected by the front windshield of the vehicle toward human eyes.

In a possible embodiment of the present disclosure, at least two projection images at different spatial positions are formed by the head-up display device, one of the projection images is configured to display vehicle state information about the vehicle, and at least one of the projection images is configured to display road condition information. The vehicle state information may include information about speed and fuel capacity, and the road condition information may include information about navigation and hazard warning.

In a possible embodiment of the present disclosure, the vehicle state information is a 2D projection image, and the road condition information is a 2D or 3D projection image.

In a possible embodiment of the present disclosure, the 2D projection image of the vehicle state information is located at a position adjacent to the driver and above an engine hood of the vehicle in a floating manner. The 2D or 3D projection image of the road state information is located at a position away from the driver and above a road surface ahead of the vehicle, and it may cooperate with an augmented reality technique so as to display the information about 3D navigation and hazard warning. In addition, in order to adapt to different road conditions, an imaging distance for the 2D or 3D projection image of the road condition information may be adjusted dynamically. For example, when the vehicle is running on a highway, the imaging distance may be 20 to 50 meters ahead of the driver, and when the vehicle is running on an urban road, the imaging distance may be 3 to 10 meters ahead of the driver.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A head-up display device, comprising:
   a light source configured to generate a to-be-modulated light beam;
   a phase spatial light modulator configured to modulate a phase of the to-be-modulated light beam and emit at least two phase-modulated light beams;
   a reproduction component configured to perform image reproduction on the at least two phase-modulated light beams, so as to generate at least two reproduced images;
   at least two diffusers configured to receive and diffuse the at least two reproduced images generated by the reproduction component respectively; and
   a reflector assembly configured to guide the at least two light beams diffused by the at least two diffusers to a projection region, so as to form at least two projection images at different spatial positions,
   wherein an incident surface of the phase spatial light modulator is divided into at least two sub-regions, the phase spatial light modulator includes at least two first loading components, each sub-region corresponds to one of the at least two first loading components, and each first loading component is configured to load a composite phase hologram of a target image, so as to modulate the phase of the to-be-modulated light beam, the composite phase hologram of the target image is generated by superimposing a phase hologram of the target image with a grating phase hologram, or with the grating phase hologram and a lens phase hologram, and the grating phase holograms of different sub-regions have different phase factors.

2. The head-up display device according to claim 1, further comprising a collimating and beam expanding component arranged between the light source and the phase spatial light modulator, and configured to convert the to-be-modulated light beam from the light source into a collimated to-be-modulated light beam and transmit the collimated to-be-modulated light beam to the phase spatial light modulator.

3. The head-up display device according to claim 1, wherein the phase spatial light modulator is a phase-only spatial light modulator.

4. The head-up display device according to claim 1, wherein the phase factor of each grating phase hologram comprises a grating period.

5. The head-up display device according to claim 1, wherein the lens phase holograms corresponding to different sub-regions have different phase factors, and the phase factor of each lens phase hologram is a focal length of a lens.

6. The head-up display device according to claim 1, wherein the phase spatial light modulator comprises a second loading component configured to load composite phase holograms of different target images in a time-division manner, so as to modulate the phase of the to-be-modulated light beam;
   the composite phase hologram of each target image is generated by superimposing a phase hologram of the target image with a grating phase hologram, or with the grating phase hologram and a lens phase hologram; and
   the grating phase holograms of different target images have different phase factors.

7. The head-up display device according to claim 1, further comprising a processor connected to the phase spatial light modulator, and configured to superimpose a phase hologram of the target image with the grating phase hologram, or superimpose the phase hologram of the target image with the grating phase hologram and the lens phase hologram, so as to generate the composite phase hologram of the target image, wherein the grating phase holograms of different target images have different phase factors.

8. The head-up display device according to claim 1, wherein the reproduction component is a Fourier lens.

9. The head-up display device according to claim 1, wherein the reflector assembly comprises a plane reflector and a concave reflector, and the light beams diffused by the at least two diffusers are reflected by a reflecting surface of the plane reflector toward the concave reflector and then reflected by a reflecting surface of the concave reflector toward the projection region.

10. The head-up display device according to claim 1, wherein the at least two diffusers comprise at least one adjustable diffuser capable of moving in an axial direction perpendicular to a projection plane where the projection image is located.

11. The head-up display device according to claim 10, further comprising a movable component configured to drive the adjustable diffuser to move in the axial direction.

12. The head-up display device according to claim 11, wherein the phase spatial light modulator further comprises a three-dimensional (3D) loading sub-component configured to superimpose different phase holograms of a same target image within a predetermined time period;

the composite phase hologram of the target image is generated by superimposing a phase hologram of the target image with the grating phase hologram and the lens phase hologram;

the lens phase holograms corresponding to different phase holograms of the same target image have different focal lengths, so that the target image is displayed at different positions in the axial direction; and the head-up display device further comprises a controller configured to move the movable component to a position in the axial direction in accordance with the positions of the target image to be displayed in the axial direction, so as to achieve 3D display.

13. The head-up display device according to claim 1, wherein the light source is a coherent light source.

14. The head-up display device according to claim 1, wherein the to-be-modulated light beam from the light source is a collimated light beam which is transmitted to the phase spatial light modulator at a predetermined angle of 2 to 20 degrees relative to a vertical incident direction.

15. A head-up display method used for the head-up display device according to claim 1, comprising steps of:

modulating the phase of the to-be-modulated light beam from the light source, so as to acquire the at least two modulated light beams in different emergent directions;

performing image reproduction on the at least two modulated light beams, so as to acquire the at least two reproduced images corresponding to the at least two modulated light beams;

receiving and diffusing, by the at least two diffusers, the at least two reproduced images; and guiding the light beams diffused by the at least two diffusers to the projection region, so as to form the at least two projection images at the different spatial positions.

16. A vehicle, comprising the head-up display device according to claim 1, wherein a light beam from the head-up display device is transmitted to a front windshield of the vehicle and reflected by the front windshield of the vehicle toward human eyes.

17. The vehicle according to claim 16, wherein one projection image is configured to display vehicle state information about the vehicle, and at least another projection image is configured to display road condition information.

18. The vehicle according to claim 17, wherein the vehicle state information is a two-dimensional (2D) projection image, and the road condition information is a 2D or three-dimensional (3D) projection image.

* * * * *